United States Patent [19]

Ikeda

[11] Patent Number: 5,180,086
[45] Date of Patent: Jan. 19, 1993

[54] JOINT STRUCTURE FOR WINDOW DUMMY

[75] Inventor: Mitsunori Ikeda, Tokyo, Japan

[73] Assignee: Kabushikigaisha Sanmanekin Kougei, Beppu, Japan

[21] Appl. No.: 716,251

[22] Filed: Jun. 17, 1991

[30] Foreign Application Priority Data

Jun. 25, 1990 [JP] Japan .................. 2-66986[U]

[51] Int. Cl.⁵ .................. D06C 15/00; F16C 11/00; F16D 1/12
[52] U.S. Cl. ............................. 223/66; 223/71; 403/97; 403/91; 403/92; 403/161
[58] Field of Search ............ 403/97, 91, 92, 161, 403/158, 51, 50; 223/66, 68, 72, 71; 446/376, 378, 381

[56] References Cited

U.S. PATENT DOCUMENTS

| | | | |
|---|---|---|---|
| 526,667 | 9/1894 | Schultz | 223/66 X |
| 982,096 | 1/1911 | Schoenhut | 223/68 X |
| 2,255,262 | 9/1941 | MacFadden | 403/97 X |
| 2,751,709 | 6/1956 | Barrango | 446/378 |
| 3,234,689 | 2/1966 | Ryan | 223/68 X |
| 3,246,422 | 4/1966 | Teagarden | 223/66 |
| 3,609,911 | 10/1971 | Hanf et al. | 446/376 |
| 4,548,446 | 10/1985 | Warshawsky | 403/97 |
| 4,630,762 | 12/1986 | Stringer | 223/66 |
| 4,690,655 | 9/1987 | Bailey | 446/376 X |

*Primary Examiner*—Werner H. Schroeder
*Assistant Examiner*—Bibhu Mohanty
*Attorney, Agent, or Firm*—Foley & Lardner

[57] ABSTRACT

A primary object of the present invention is to provide an improved joint structure for a window dummy to ensure that any joints can be easily rotated, turned or bent within a remarkably wide angle, and which shows good appearance. This joint structure comprises a hollow member including two half members each of which is formed with at least one of slidably engaging section capable of slidably engaging each other; and at least two connection members whose one end is fixed to a rod of arm, leg, or the like and the other end is rotatably connected to the other connection member in the hollow member. Further each of the connection member is independently fixed to the half member of the hollow member. One of the connection member is formed with means to prevent from interfering with the other half member fixed with the other connection member.

4 Claims, 6 Drawing Sheets

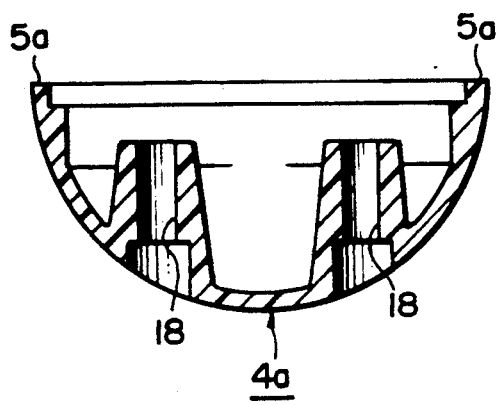
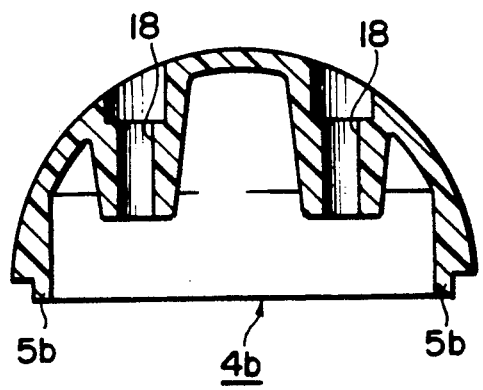
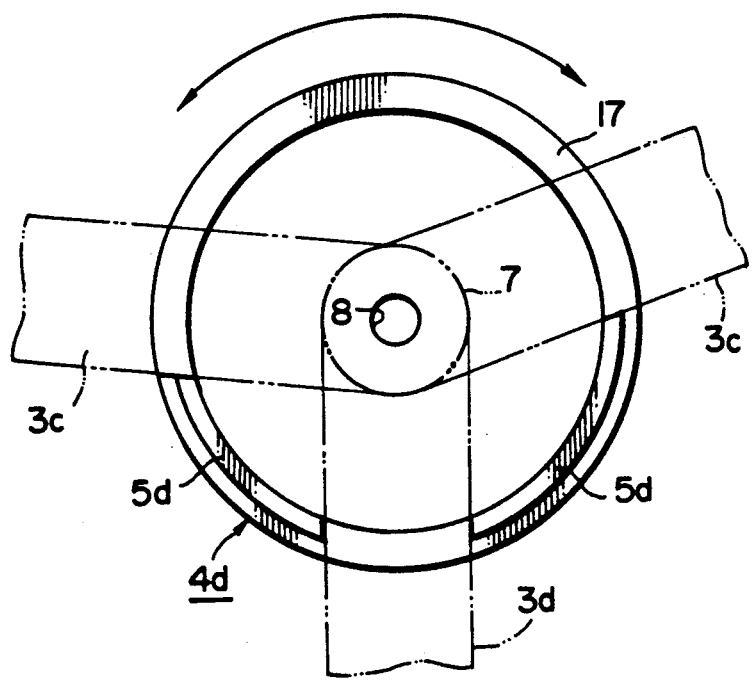

JOINT STRUCTURE FOR WINDOW DUMMY

BACKGROUND OF THE INVENTION

1. Field of the Invention

The present invention generally relates to joint structure for a window dummy which is commonly used as a display mannequin. More particularly, the invention relates to an easily movable joint structure for a window dummy, which joint comprises a ball-shaped connection means capable of revolving and swinging.

2. Description of Prior Art

A window dummy has been well known as a display doll device to display dresses and the like in a show-window. Although a commonly used window dummy is figured to imitate the human body, recently used dummies are formed in various shapes and made of various materials.

Further, such window dummies are generally provided with movable arms, neck, legs, hands, waist and so on, to freely change their postures so as to fit any dresses and any display scenes. For example, a light weight and plate shape dummy is provided with rod shape arms and legs made of flexible material. Since this flexible rod does not require any joints, it can be freely bent at any desired position and any desired angle.

On the other hand, a human-body like dummy is also provided with many movable joints to vary its display posture. Various movable joint structures capable of revolving and swinging are well known.

For example, one typical movable joint structure comprises a ball-shaped connection means whose opposite ends are respectively secured to rods used as an arm or leg. The ball-shaped connection means is composed of two hemispheres which can be turned around each other for 360° about a pivot through a thrust bearing. In the ball-shaped connection means, each of the arm and leg rods is rotatably fixed by a bolt or the like so as to bend the arm or leg. The surface of the ball-shaped connection means is further formed with a slit by which the rod of the arm or leg can be rotatably moved for 90° along the surface.

In another example of ball-shaped connection means, each contact surface of the hemispheres is formed with fine recesses and fine projections, and the hemispheres are forcibly in contact with each other by a coil spring or the like. In order to bend the joint according to this structure, the hemispheres are forcibly separated and turned to a desired angle against the spring force by an operator.

When the window dummy is used for displaying dresses, the dummy joints should have a good appearance and should be easily and freely bent to a desired angle.

The first movable joint structure discussed above, does not have a good appearance because the ball-shaped connection means is formed with the slit and causes a problem because the rotating angle of the arm or leg rod is limited to only 90°.

The second example of the ball-shaped connection means discussed above also has a disadvantage in the way the joint is adjusted to vary the posture of the dummy. Since the hemispheres are always subjected to the spring force, the separating and turning operation of the hemispheres requires a relative strong force to move the dummy to a required posture, or to move the dummy in order to put a dress on or take a dress off the dummy. The joint adjusting work will be repeated on respective joints. Thus, persons who are not very strong such as women, will find it difficult to adjust the posture of this type of window dummy.

BRIEF SUMMARY OF INVENTION

It is a primary object of the present invention to provide an improved joint structure for a window dummy to ensure that any joints can be easily rotated, turned or bent within a remarkably wide angle.

Another object of the present invention is to provide an improved joint structure for a window dummy, which shows good appearance.

To accomplish the above objects, the joint structure according to the present invention comprises a hollow member including two half members each of which is formed with at least one of a slidably engaging section capable of slidably engaging each other; and a plurality of connection members whose each one end is fixed to a rod of arm, leg, or the like and the other end is rotatably connected to the other connection member in the hollow member. Further each of the connection members is independently fixed to the half member of the hollow member. At least one of the connection members and/or one of the half members are/is provided with means for preventing the connection member from interfering with the other side half member.

In such constituted joint structure, as the connection member is rotated, the half member is also slidingly rotated so that the connection member is not interfered with the engaging section of the other side half member.

Other features and advantages of the invention will be apparent from the following description taken in connection with the accompanying drawings.

BRIEF DESCRIPTION OF THE DRAWINGS

FIG. 8 is an elevational view in section of the hemisphere shown in FIG. 6;

FIG. 9 is an elevational view in section of the hemisphere shown in FIG. 7;

FIG. 11 is a schematic plan view showing another configuration of the hemisphere according to the second embodiment of the invention and showing the connection members, represented by the phantom line, in rotating state.

DETAILED DESCRIPTION OF THE PREFERRED EMBODIMENT

Figure 1:
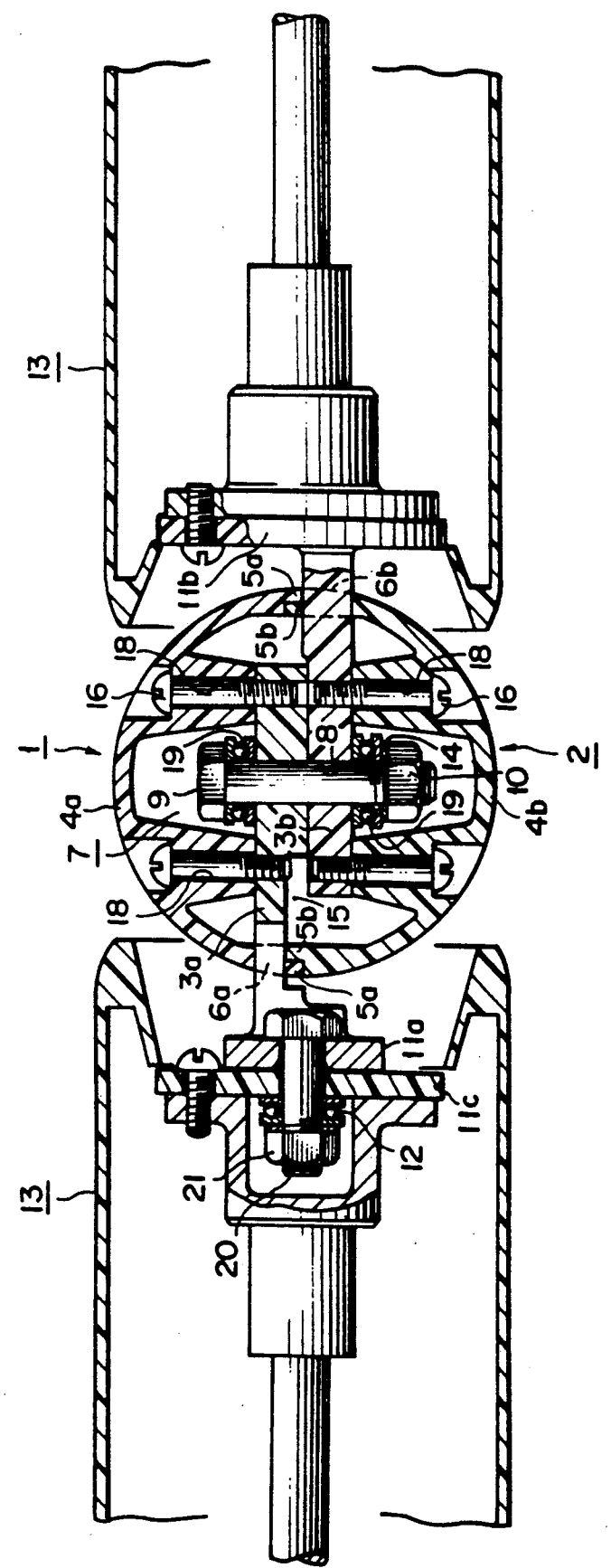
FIG. 1 is an elevational view in section showing the ball-shaped joint structure for various window dummies according to the first embodiment of the invention.
Figure 10:
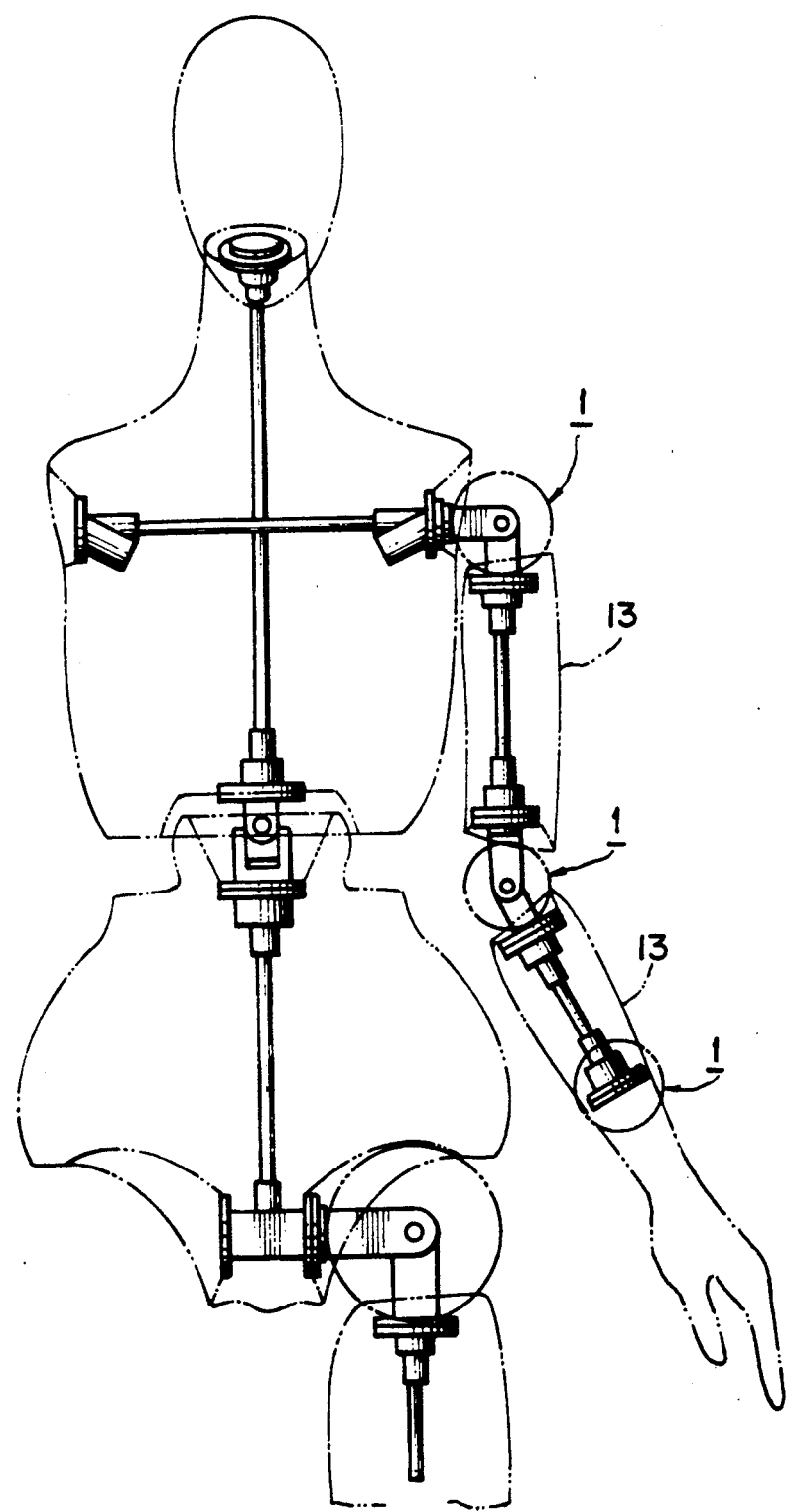
FIG. 10 is a schematic illustration showing one example of the window dummy equipped with the joints according to the present invention.

Referring to FIG. 1, there is shown one example of the joint structure adapted for various window dummies according to the first embodiment of the present invention. As disclosed above, FIG. 1 shows an overall view of the joint structure wherein the reference numeral 1 denotes a ball-shaped joint, per se. In this embodiment, joint 1 can be applied to shoulders, arms, legs, and the like as shown in FIG. 10.

Figure 6:
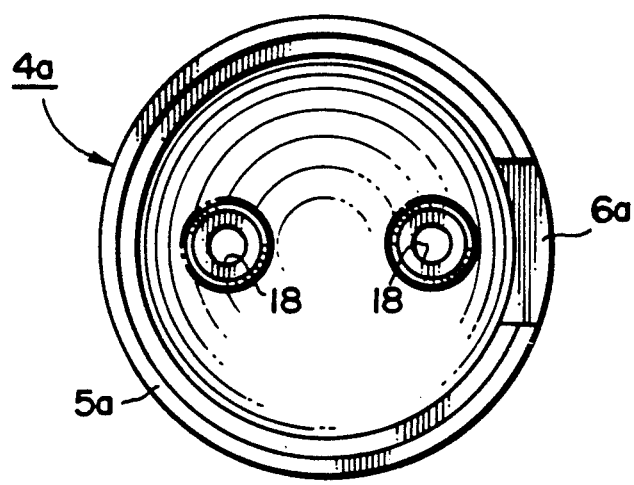
FIG. 6 is a plan view showing the contact surface of one hemisphere; i.e., a half member of the ball-shaped hollow member shown in FIG. 1.
Figure 7:
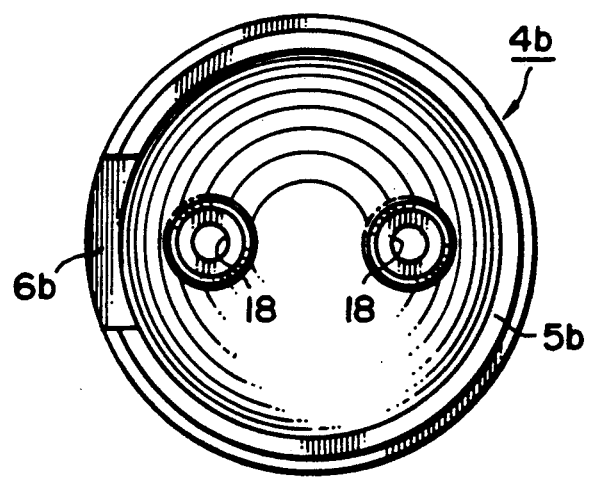
FIG. 7 is a plan view of the other hemisphere to be slidably engaged with the hemisphere shown in FIG. 6.

The joint 1 basically comprises a ball-shaped hollow member 2 and two connection members 3a and 3b. The ball-shaped hollow member 2 further includes two hemispheres, first and second 4a and 4b made of a hard type synthetic resin and the like. The first hemisphere 4a is formed with a first engaging section 5a extending along the circumferential edge of the contact surface of the first hemisphere 4a as shown in FIG. 6 and FIG. 8. The second hemisphere 4b is also formed with a second engaging section 5b extending along the circumferential edge of the contact surface of the second hemisphere 4b as shown in FIG. 7 and FIG. 9. The first engaging section 5a is slidably engaged with the second engaging section 5b when these two hemispheres 4a and 4b are assembled. This engagement between the first engaging section 5a and the second engaging section 5b ensures that the first and second hemispheres 4a and 4b can be circularly moved.

The first and second hemispheres 4a and 4b are respectively further formed with first and second slit like cut sections 6a and 6b through which the connection members 3a and 3b are inserted and assembled with the ball-shaped hollow member 2.

Each of the hemispheres 4a and 4b is formed with two through holes 18 through which bolts 16 are threadingly engaged with the connection members 3a and 3b.

The connection members 3a and 3b are substantially formed as a plate shape member having thickness of 5 to 10 mm, and length and width dependent on the scale of the joint structure to be produced, for example about 40 to 100 mm, respectively and 10 to 30 mm. The connection members 3a and 3b include tongue-shape sections 7a and 7b which are formed with openings 8a and 8b, respectively. The tongue-shape sections 7a and 7b of the connection members 3a and 3b are partially overlapped and rotatably connected by a bolt 9 set in the openings 8a and 8b, two nuts 10, two washers 14 and two thrust bearings 19 in the ball-shaped hollow member 2.

Figure 2:
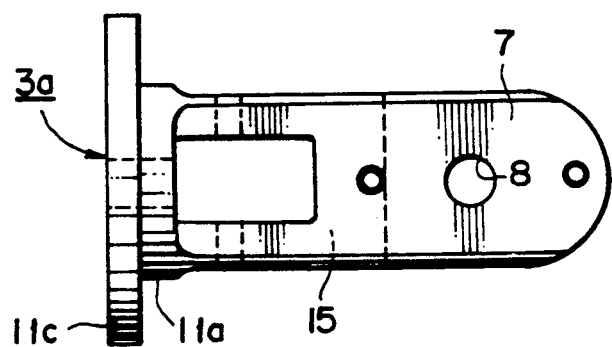
FIG. 2 is a plan view showing one example of the connection member used in the joint structure of the first embodiment of the invention.
Figure 3:
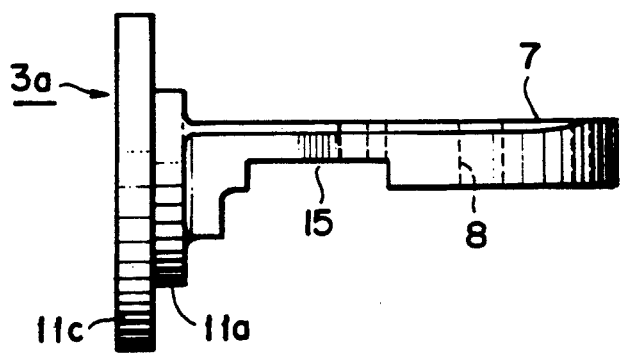
FIG. 3 is an elevational view of the connection member shown in FIG. 2.
Figure 4:
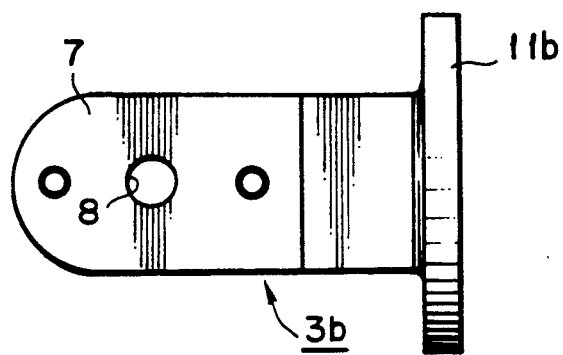
FIG. 4 is a plan view showing another example of the connection member used in the joint structure of the invention.
Figure 5:
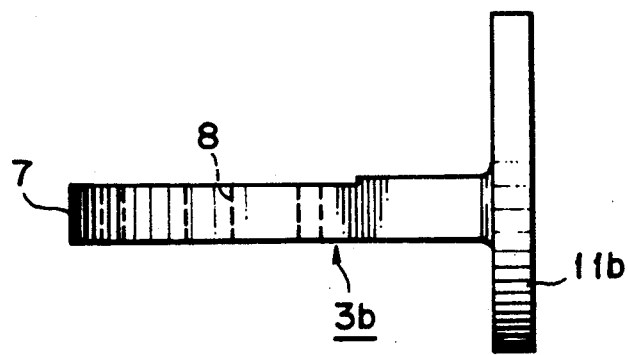
FIG. 5 is an elevational view of the connection member shown in FIG. 4.

Further, the connection members 3a and 3b respectively include disk-shape base sections 11a and 11b which meet at right angles to the tongue shape sections 7a and 7b. The disk-shape base section 11b is integrally formed with the tongue shape section 7b as shown in FIG. 4 and FIG. 5, or a disk member 11c having a larger diameter than the disk-shape base section 11a integrally formed with the tongue shape section 7a, is further fixed to the base section 11a as shown in FIG. 2 and FIG. 3.

The disk-shape base section 11a and the disk member 11c of the connection member 3a is rotatably connected to a rod 13a of an arm, as an example, 13 through a bolt 20, a nut 21 and a thrust bearing 12. According to this connection, the rod 13a can be turned about the bolt 20 in a perpendicular direction to the rotating direction of the connection member 3a about the bolt 9.

The connection member 3a is insertedly engaged with the slit like cut section 6a of the first hemisphere 4a and the connection member 3b is also engaged with the slit like cut section 6b of the second hemisphere 4b. The connection member 3a is further formed with a stepped recess 15 as shown in FIG. 3 which faces the second engaging section 5b of the second hemisphere 4b without interfering therewith.

Although, in this embodiment, the stepped recess 15 is thinner than the other section, only the tongue shape section 7a may be thicker than the other section including the stepped recess 15. Alternatively, the connection member 3a may be formed in a thin plate and an additional spacer, not shown in the drawings, may be interposed between the tongue shape sections 7a of the first connection member 3a and the second connection member 3b to prevent the first connection member 3a from interfering with the second engaging section 5b.

The first connection member 3a is fixed to the first hemisphere 4a through first bolts 16a and the second connection member 3b is fixed to the second hemisphere 4b through second bolts 16b.

Thus, the configured members are assembled as the joint structure as shown in FIG. 1. The first connection member 3a and the second connection member 3b are rotatably connected through the bolt 9, and the first connection member 3a is fixed to the first hemisphere 4a and the second connection member 3b is fixed to the second hemisphere 4b, respectively. The first and second hemispheres 4a and 4b are combined to form a ball-shaped hollow member 2 by slidably engaging their engaging sections 5a and 5b. The stepped recess 15 of the first connection member 3a allows the connection members 3a and 3b accompanied with the hemispheres 4a and 4b to rotate fully until they conflict.

FIG. 11 shows another configured hemisphere 4d according to a second embodiment of the invention, which is formed in the substantially same manner as the first hemisphere 4a except for a slidably engaging section 5d. In detail, the engaging section 5d is additionally formed with a circumferentially wide cut section 17 to allow a connection member 3c to rotate widely. The connection member 3c is formed in an event plate having the equivalent thickness without any stepped recess. Thus, configured hemisphere 4d is slidably engaged with the other hemisphere 4c, not shown, which is configured as in the first embodiment.

In this second embodiment, the rotating angle of the connection member 3c with respect to the connection member 3d is approximately 180° which is limited within the cut section 17.

As explained above, the inventive configured joint structure has a good appearance, a smooth surface and can be easily rotated and freely adjusted without a great deal of force as compared to conventional joint structures. Further, the inventive joint structure can be rotated in any direction through a wide angular range as compared to conventional joints. Therefore, the window dummy equipped with the joint structure according to the present invention will ensure the movable components of a window dummy can be more easily moved into any display posture as compared to conventional window dummies.

As many apparently widely different embodiments of this invention may be made without departing from the spirit and scope thereof, it is to be understood that the invention is not limited to the specific embodiments thereof except as defined in the appended claims.

I claim:

1. A joint structure for a window dummy, comprising:
   - a hollow member having first and second half members each of which is formed with at least one slidably engaging section, said slidably engaging sections being in slidable engagement with each other, and each of said slidably engaging sections having a slit-like cut therein; and
   - first and second connection members each having first and second ends and being independently fixed to a corresponding one of said first and second half members, said first end of said first and second connection members being rotatably connected to each other, said second end of said first connection member being rotatably connected to a first rod of the window dummy, and said second end of said second connection member being fixed to a second rod of the window dummy;
   - wherein said first connection member further comprises a tongue-shaped section, a stepped recess section preventing said first connection member from interfering with said slidably engaging section of said second half member, and a disk shaped base section being rotatably connected to said first rod at a right angle relative to a rotating direction of said tongue-shaped section of said first connection member;
   - wherein said first and second connection members each pass through a corresponding one of said slit-like cuts and into said hollow member;
   - wherein said second connection member further comprises a tongue-shaped section being rotatably connected to said tongue-shaped section of said first connection member and a disk-shaped base section being fixed to said second rod.

2. A joint structure as claimed in claim 1, wherein said hollow members is formed in a ball-shape and said first and second half members are formed in a hemisphere shape.

3. A joint structure as claimed in claim 1, wherein one of said slidably engaging sections is formed along an internal edge of the other of said first and second members.

4. A joint structure as claimed in claim 3, wherein said other of said slidably engaging sections has a cut portion therein allowing said first connection member to rotate without interfering with said one of said slidably engaging sections.

* * * * *